(12) United States Patent
Lee (10) Patent No.: US 6,999,880 B2
(45) Date of Patent: Feb. 14, 2006

(54) SOURCE-INDEPENDENT FULL WAVEFORM INVERSION OF SEISMIC DATA

(75) Inventor: Ki Ha Lee, Lafayette, CA (US)

(73) Assignee: The Regents of the University of California, Oakland, CA (US)

( * ) Notice: Subject to any disclaimer, the term of this patent is extended or adjusted under 35 U.S.C. 154(b) by 150 days.

(21) Appl. No.: 10/799,131

(22) Filed: Mar. 11, 2004

(65) Prior Publication Data

US 2004/0186667 A1    Sep. 23, 2004

Related U.S. Application Data

(60) Provisional application No. 60/456,168, filed on Mar. 18, 2003.

(51) Int. Cl.
*G01V 1/28* (2006.01)
(52) U.S. Cl. .......................................... 702/14; 702/13
(58) Field of Classification Search ................ 702/6, 702/11–14, 17; 703/10; 367/73
See application file for complete search history.

(56) References Cited

OTHER PUBLICATIONS

Bertsekas, D. P., 1982, Enlarging the region of convergence of Newton's method for constrained optimization, J. Optimization Theroy Applications, 36, 221-251.
Graves, R. W., 1996, Simulating seismic wave propagation 3D elastic media using staggered-gris finite differences, Bull. Seism. Soc. Am., 86, 1091-1106.
Kormendi, F., and Dietrich, M., 1991, Nonlinear waveform inversion of plane-wave seismograms in stratified elastic media, Geophysics, 56, 664-674.
Levander, A. R., 1988, Fourth-order finite difference P-SV seismograms, Geophysics, 53, 1425-1436.
Marfurt, K. J., 1984, Accuracy of finite-difference and finite-element modeling of the scalar and elastic wave equations, Geophysics, 49, 533-549.
Minkoff, S.E., and Symes, W. W., 1997, Full waveform inversion of marine reflection data in the plane-wave domain, Geophysics, 62, 540-553.
Oldenburg, D. W., McGillivray, P. R., and Ellis, R. G., 1993, Generalized subspace methods for large-scale inverse problems, Geophys. J. Int., 114, 12-20.
Plessix, R.-E., and Bork, J., 1998, A full waveform inversion example in VTI media: 68th Ann. Internat. Mtg., Soc. Expl. Geophys., Expanded Abstracts, 1562-1565.
Pratt, R. C., 1990, Inverse theory applied to multi-source cross-hole tomography, Part II: elastic wave-equation method, Geophys. Prospect. Prospect., 38, 311-330.

(Continued)

*Primary Examiner*—Donald McElheny, Jr.
(74) *Attorney, Agent, or Firm*—Joseph R. Milner (57) ABSTRACT

A set of seismic trace data is collected in an input data set that is first Fourier transformed in its entirety into the frequency domain. A normalized wavefield is obtained for each trace of the input data set in the frequency domain. Normalization is done with respect to the frequency response of a reference trace selected from the set of seismic trace data. The normalized wavefield is source independent, complex, and dimensionless. The normalized wavefield is shown to be uniquely defined as the normalized impulse response, provided that a certain condition is met for the source. This property allows construction of the inversion algorithm disclosed herein, without any source or source coupling information. The algorithm minimizes the error between data normalized wavefield and the model normalized wavefield. The methodology is applicable to any 3-D seismic problem, and damping may be easily included in the process.

18 Claims, 4 Drawing Sheets

OTHER PUBLICATIONS

Pratt, R. G., 1999-a, Seismic waveform inversion in frequency domain, Part 1: Theory and verification in physical scale model, Geophysics, 64, 888-901.

Pratt, R.G., 1999-b, Seismic waveform inversion in frequency domain, Part 2: Fault delineation in sediments using cross hole data, Geophysics, 64, 902-914.

Pratt, R. G., Shin, C., Hicks, G. J., 1998, Gauss-Newton and full Newton methods in frequency-space seismic waveform inversion, Geophys. J. Int., 133, 341-362.

Pratt, R. G., and Worthington, M. H., 1990, Inverse theory applied to multi-source cross-hole tomography, Part I: acoustic wave-equation method, Geophys. Prospect., 38, 287-310.

Randall, C.J., 1989, Absorbing boundary condition for the elastic wave equation, velocity-stress formulation, Geophysics, 54, 1141-1152.

Sen, M. K., and Stoffa, P. L., 1991, Nonlonear one-dimensional seismic waveform inversion using simulated annealing, Geophysics, 56, 1624-1638.

Sheng, J., and Schuster, G. T., 2000, Finite-frequency resolution limits of travel time tomography for smoothly varying velocity models: 70th Ann. Internat. Mtg., Soc. Expl. Geophys., Expanded Abstracts, 2134-2137.

Song, Z.-M., and Williamson, P. R., 1995, Frequency-domain acoustic modeling and inversion of cross hole data: part I-2.5-D modeling method, Geophysics, 60, 784-795.

Song, Z.-M., Williamson, P. R., and Pratt, R. G., 1995, Frequency-domain acoustic wave modeling and inversion of cross hole data: Part II-inversion method, synthetic experiments and real-data results, Geophysics, 60, 796-809.

Tarantola, A., 1987, Inverse Problem Theory: Methods for Data Fitting and Parameter Estimation: Elsevier, Amsterdam, cover page.

Vasco, D. W., Peterson, Jr., J.E., and Maier, E.L., 1995, Beyond ray tomography: Wavepaths and Fresnel volumes: Geophysics, 60, 1790-1804.

Virieux, J., 1984, P-SV wave propagation in heterogeneous media: velocity-stress finite-difference method, Geophysics, 51, 889-901.

Virieux, J., 1986, SH wave propagation in heterogenous media: velocity-stress finite-difference method, Geophysics, 49, 1933-1942.

Yomogida, K., and Etgen, J. T., 1993, 3-D wave propagation in the Los Angeles Basin for the Whittier-Narrows earthquake, Bull. Seism. Soc. Am. 83, 1325-1344.

Zhou, C., Schuster, G. T., Hassanzadeh, S., and Harris, J. M., 1997, Elastic wave equation travel time and wavefield inversion of crosswell data, Geophysics, 62, 853-868.

SOURCE-INDEPENDENT FULL WAVEFORM INVERSION OF SEISMIC DATA

CROSS REFERENCE TO RELATED APPLICATIONS

This application claims priority to U.S. Provisional Patent Application No. 60/456,168, filed Mar. 18, 2003 entitled "Method and article of manufacture for source-independent full waveform inversion of seismic data", which is hereby incorporated by reference in its entirety.

STATEMENT REGARDING FEDERAL FUNDING

This invention was made with U.S. Government support under Contract Number DE-AC03-76SF00098 between the U.S. Department of Energy and The Regents of the University of California for the management and operation of the Lawrence Berkeley National Laboratory. The U.S. Government has certain rights in this invention.

REFERENCE TO A COMPUTER PROGRAM

Not applicable.

BACKGROUND OF THE INVENTION

1. Field of the Invention

The present invention pertains generally to methods used in the inversion of data, more particularly to the inversion of seismic data, and still more particularly to the full wave seismic inversion of seismic data without using a source term.

2. Description of the Relevant Art

Common seismic industry practice is that velocity structure is estimated by analyzing the travel time of a set of seismic signals. In cross hole and surface-to-borehole applications, typical approaches involve ray tracing in which the ray may be straight or curved depending on the degree of resolution desired, and more recently the Fresnel volume approach. The travel time approach is fundamentally a high-frequency approximation with a maximum resolution on the order of a wavelength, or a fraction (5%) of the well separation in some practical cases. The usefulness of the result obtained from the ray tomography may be limited if the objective is to better understand the petrophysical and hydrological 'properties' of the soil and rock: an increasingly important subject in characterizing petroleum and geothermal reservoirs, with potential environmental applications.

A better alternative to the travel time approach appears to be full waveform inversion. A number of recent studies on this subject suggest that full waveform inversion may provide improved resolution of velocity and density structures. Amplitude and phase information contained in the waveform are both sensitive to intrinsic energy loss of the propagating wave through dispersion, and to the petrophysical properties of the material through which the wave propagates. These sensitivities are utilized by full waveform analysis to form an attractive tool for investigating hydrological and petrophysical properties of a geophysical medium.

Full waveform inversion has a major impediment to easy implementation. In all field applications, the effective source waveform and the coupling of the medium between the source and the receiver are not very well understood. The effective source waveform and its coupling to the medium under study are generally taken together as a lumped "source term". The source/medium coupling problem can be resolved to some extent by using a good velocity approximation in geophysical applications; however, the measured signal cannot generally be accurately calibrated, rendering full waveform inversion a technical challenge.

BRIEF SUMMARY OF THE INVENTION

This invention provides for an iterative method of using normalized waveform inversion to obtain a model parameter describing one or more physical properties of a medium, the method comprising the steps of: a) inputting one or more each of NS source and NG measurement spatial locations; b) measuring time domain data at each of the NG measurement locations resulting from an input waveform at one of the NS source locations propagating through a medium, i) for each of the NS source locations, ii) thereby forming a time domain measurement data set $D_{ji}^{d}(t)$, (j=1~NG; i=1~NS), where d denotes a data tensor; c) Fourier transforming the time domain measurement data set $D_{ji}^{d}(t)$ to create a measurement spectral data set $D_{ji}^{d}(\omega)$ having frequency and amplitude information for each of the NG measurement locations; d) normalizing the measurement spectral data set $D_{ji}^{d}(\omega)$ to create a normalized data wavefield $T_{ji}^{d}(\omega)$; e) modeling the medium using an iterated model parameter m describing one or more physical properties of the medium, the NS source and the NG measurement spatial locations used as respective model input and model response spatial locations contained within the model of the medium, and initializing the iterated model parameter m with corresponding one or more known bulk properties of the medium being modeled, said modeling step comprising: i) creating a measurement model by: (1) applying a delta function source collocated with the $i^{th}$ NS source, (2) modeling the response at the NG measurement locations, using a time domain modeling method, to create a synthetic medium response at the $j^{th}$ receiver due to the $i^{th}$ source, $P_{ji}^{m}(t)$, m denoting the model response, (3) repeating the applying and modeling steps at each of the NS source locations and NG measurement locations until the measurement model is full, and ii) Fourier transforming the model response $P_{ji}^{m}(t)$, to obtain a frequency domain synthetic response $P_{ji}^{m}(\omega)$; iii) forming a normalized modeled wavefield using the frequency domain synthetic response $T_{ji}^{m}(\omega)=P_{ji}^{m}(\omega)[P_{1i}^{m}(\omega)]^{-1}$; and f) minimizing a weighted error, between the normalized data wavefield $T_{ji}^{d}(\omega)$ and the normalized modeled wavefield $T_{ji}^{m}(\omega)$ of the response of the medium, to a level below an error bound, i) said weighted error met by using the iterated model parameter m, known as the a minimized model parameter m.

In the method described above the modeled normalized wavefield $T_{ji}^{m}(\omega)$ is independent of the input waveform applied to any of the NS source locations, and may be used for a variety of applications, so long as they are capable of modeling the physical medium under test. Such modeling may utilize finite elements of various types, boundary elements, mixtures of both, and/or discrete finite differences. The results of the models at the iterative step concluding the minimization results in the minimizing model parameter m, which may be directly stored in a computer-readable medium, or immediately processed into a display of the minimizing model parameter m as a graphical representation of one or more of the physical properties of the medium measured, and optionally stored as a data set or data structure in a computer-readable medium. Although the thrust of this invention is highlighted herein to the field of seismic analysis, it is not restricted to such field.

The methods described above may be further stored as a computer program in at least one computer-readable medium, to allow for execution on a computer.

The method of normalized waveform inversion uses minimization of weighted error $\phi(m)$ that is calculated by a square of the weighing matrix $W_d$ multiplied by the difference between the normalized data wavefield $T_{ji}^d(\omega)$ and the normalized modeled wavefield $T_{ji}^m(\omega)$, or $\phi(m)=\|W^d(T_{ji}^m(\omega)-T_{ji}^d(\omega))\|^2$ summed over all frequencies, NS sources, and NG receivers. The weighing matrix $W_d$ is an inverse of the standard deviation of the normalized data wavefield $T_{ji}^d(\omega)$, or other appropriate weighting method indicative of the convergence of the minimization.

The detailed normalization step described above is further comprised of the steps of: a) choosing one of the measurement spectral data set $D_{ji}^d(\omega)$ at one of the measurement locations, such as $D_{1i}^d(\omega)$, i) said chosen measurement spectral data set $D_{1i}^d(\omega)$ known as a reference measurement; ii) dividing the measurement spectral data set $D_{ji}^d(\omega)$ at a particular frequency in the measurement spectral data set $D_{ji}^d(\omega)$, iii) by the reference measurement $D_{1i}^d(\omega)$ at the same frequency, b) to create a normalized data wavefield $T_{ji}^d(\omega)$.

The error bound of the minimizing step is met by first assigning an initial weighted error $E_0$, then dividing each subsequent iterated weighted error $E_k$ by the initial error $E_0$ to create a relative error $$\frac{E_k}{E_0}.$$

When the relative error $$\frac{E_k}{E_0}$$

is below a pre-established error bound, preferably below $10^{-5}$, more preferably below $10^{-6}$, still more preferably below $10^{-7}$, and possibly below $10^{-8}$, the iterations of the minimization step conclude. Typically an error bound on the order of $10^{-7}$ works particularly well. The model parameter m that achieved this error bound is then the solution to the minimization problem, and the wavefield inversion is complete.

In another embodiment of this invention, modeling takes place not in the time domain, but rather in the frequency domain as a modal analysis. In this case, the delta function input, which has an infinite number of Fourier frequencies, is truncated at the highest frequency present in the model data. In this implementation, the frequency domain synthetic response $P_{ji}^m(\omega)$ is directly obtained in the frequency domain. As with the previous methods, the frequency-based model, minimized model parameter m solution, and plots of the physical properties of the model parameter m solution may be stored on a computer-readable medium for further computations on a computer.

In yet another embodiment, an article of manufacture comprises a computer-readable medium having the method of full waveform inversion described above placed upon it for subsequent execution on a computer.

BRIEF DESCRIPTION OF THE SEVERAL VIEWS OF THE DRAWINGS

The invention will be more fully understood by reference to the following drawings, which are for illustrative purposes only.

DETAILED DESCRIPTION OF THE PREFERRED EMBODIMENT

Defined Terms

Computer means any device capable of performing the steps developed in this invention to result in an optimal waterflood injection, including but not limited to: a microprocessor, a digital state machine, a field programmable gate array (FGPA), a digital signal processor, a collocated integrated memory system with microprocessor and analog or digital output device, a distributed memory system with microprocessor and analog or digital output device connected with digital or analog signal protocols.

Computer readable media means any source of organized information that may be processed by a computer to perform the steps developed in this invention to result in an optimal waterflood injection, including but not limited to: a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FGPAs), flash random access memory (flash RAM); and remotely transmitted information by electromagnetic or optical methods.

Physical property means a derived or observable, measurable characteristic of sample, including, but not limited to speed of sound in a specified direction, density, permeability, porosity, resistivity, permittivity, Young's modulus, tensor stress-strain properties, speed of sound propagation, shear modulus, amount of water present, and amount of oil present.

Bulk property means a physical property of a medium spatially averaged over a volume of interest.

Time domain measurement data set means a collection of data measured in the time domain such as a seismogram, possibly including spatial information of one or more source and/or receiver locations.

Wavefield means modeled or measured data, or combination of such data, that obey differential equations describing wave motion in time domain or in frequency domain.

Normalized data wavefield means measured data at any receiver point normalized by measured data at a reference point in the frequency domain.

Normalized modeled wavefield means modeled (calculated) data at any receiver point normalized by modeled data at a reference point in the frequency domain.

Introduction

Source-independent full waveform inversion of seismic data can lead to high-resolution imaging of subsurface geophysical parameters that would otherwise have not been possible using other conventional methods. Detailed information of distribution of geophysical parameters are crucial in understanding the spatial distribution of gas and fluid, and their movement when repeated measurements are made over time. Potential applications of the proposed method include, but are not limited to exploration of oil, methane hydrate, and geothermal resources, characterization and monitoring of various petrological reservoirs, $CO_2$ sequestration, and environmental remediation processes.

Normalized Wavefield Analysis

Without loss of generality, let us assume a field survey involving NS transmitter positions and NG receiver positions of arbitrary configurations, but with known spatial locations. Additionally, the spatial coordinates of the boundary of the medium are also known. In acquiring data, the source and receiver deployment configuration is an important part of survey design for successfully achieving the desired survey objective. The full waveform inversion scheme described herein is general, since any arbitrary configuration is acceptable: surface or single borehole reflection, surface-to-borehole or borehole-to-surface conventional processing of time-lapse Vertical Seismic Profiling (VSP) data, cross-hole, or combinations of these.

To develop the full 3-D normalized wavefield inversion method, a full tensor measurement is required with three linearly independent component measurements at each receiver spatial position for each one of three transmitting events at each source spatial position. The data tensor may be in the form of pressure, displacement, velocity or acceleration, and may be described in general as $$D_{ji}^d(t) = R_j(t) \otimes P_{ji}^d(t) \otimes S_i(t), \quad (j=1\sim NG;\ i=1\sim NS) \quad (1)$$

The superscript d indicates data and each constituent in this equation is a (3×3) tensor. Equation (1) states that the data $D_{ji}^d(t)$ recorded at the $j^{th}$ receiver position is a multiple convolution of the actually transmitted source $S_i(t)$ that includes source system function and the radiation pattern caused by source-medium coupling, the impulse response $P_{ji}^d(t)$ of the medium at the $j^{th}$ receiver due to the $i^{th}$ source, and the receiver system function $R_j(t)$ including the medium-receiver coupling. In the following method of analysis, we will remove the $R_j(t)$ by assuming that the receiver (geophone) calibration is known and the effect of medium-receiver coupling to data is relatively minor compared to that of the source waveform. The source function $S_i(t)$ is generally not well understood, and is a subject of considerable ongoing research just by itself, in order to improve the quality of data sampling. The impulse response $P_{ji}^d(t)$ is the solution to the governing differential equation of the medium under test, with an impulse source in time at the $i^{th}$ position. If we Fourier transform Equation (1), $FT\{(D,S,P)(t)\} \rightarrow (D,S,P)(\omega)$, with the $R_j(t)$ term neglected, we get $$D_{ji}^d(\omega) = P_{ji}^d(\omega) S_i(\omega) \quad (2)$$

The transformed frequency domain data contains all of the information the time series originally contained. In the time-series data, longitudinal and transverse waves of primary arrivals are followed by events of converted modes, multiple reflections, and all other scattering waves caused by heterogeneities in the sampling medium. The data at the $j^{th}$ receiver position may then be described with Equation (2) as $$D_{ji}^d(\omega) = \{d_{aji}^d, d_{bji}^d, d_{cji}^d\}(\omega) = \begin{bmatrix} d_{1aji}^d & d_{1bji}^d & d_{1cji}^d \\ d_{2aji}^d & d_{2bji}^d & d_{2cji}^d \\ d_{3aji}^d & d_{3bji}^d & d_{3cji}^d \end{bmatrix}(\omega), \quad (3)$$

Multiple subscripts 'lkji' are used to describe data elements. The last two subscripts 'ji' only indicate receiver (j=1, 2, ..., NG) and source (i=1, 2, ..., NS) positions, and the first two subscripts 'lk' are used to describe Cartesian field components l=(1, 2, 3). Elements of the tensor source function $S_i(W)$ in equation (2) are unknown. The tensor source function is composed of three source vectors $[s_{ai}, s_{bi}, s_{ci}](\omega)$ and each source vector may in turn be composed of three unknown Cartesian components; i.e., $s_{ai} = (s_{1ai}, s_{2ai}, s_{3ai})^T$. So, the source tensor at the i-th position may be fully described by $$S_i(\omega) = \{s_{ai}, s_{bi}, s_{ci}\}(\omega) = \begin{bmatrix} s_{1ai} & s_{1bi} & s_{1ci} \\ s_{2ai} & s_{2bi} & s_{2ci} \\ s_{3ai} & s_{3bi} & s_{3ci} \end{bmatrix}(\omega). \quad (4)$$

The tensor impulse response of the medium that relates the diagonal impulse source at the $i^{th}$ transmitter position to the measurements at the $j^{th}$ receiver position may be written as $$P_{ji}^d(\omega) = \{p_{1ji}^d, p_{2ji}^d, p_{3ji}^d\}(\omega) = \begin{bmatrix} p_{11ji}^d & p_{12ji}^d & p_{13ji}^d \\ p_{21ji}^d & p_{22ji}^d & p_{23ji}^d \\ p_{31ji}^d & p_{32ji}^d & p_{33ji}^d \end{bmatrix}(\omega). \quad (5)$$

To define the normalized wavefield (alternatively known as the transfer function of the medium under test), we first select the reference point (which may be any of the measurement locations), say j=1 for convenience. The tensor normalized data wavefield (or data transfer function) is now defined by the data at j=1~NG, normalized by that of the reference point:

$$\begin{aligned} T_{ji}^d(w) &= D_{ji}^d(w)[D_{1i}^d(w)]^{-1} \quad (6) \\ &= P_{ji}^d(w) S_i(w) [S_i(w)]^{-1} [P_{1i}^d(w)]^{-1} \\ &= P_{ji}^d(w)[P_{1i}^d(w)]^{-1} = \begin{bmatrix} t_{11ji}^d & t_{12ji}^d & t_{13ji}^d \\ t_{21ji}^d & t_{22ji}^d & t_{23ji}^d \\ t_{31ji}^d & t_{32ji}^d & t_{33ji}^d \end{bmatrix}(w), \end{aligned}$$

where the convention of the subscripts for the transfer function is the same as that used for impulse response. In Equation (6) the source term $S_i(\omega)$ divides out to unity, so the transfer function is defined as the normalized impulse response of the medium; hence the uniqueness of the transfer function. The necessary condition for the source term to divide out is that the determinant of the source matrix is non-zero. In other words, the source events need to be linearly independent. This condition can be met, in principle, even if source events consist of explosions, so long as their Cartesian constituents are linearly independent.

In this procedure we assume that for each source, i=1~NS, NG measurements are made simultaneously. If for some reason all NG data cannot be taken simultaneously, a simultaneous data set may be simulated if neighboring subsets share at least one overlapping receiver position. Since we do not know the medium, the impulse response itself is not known either at this point.

Full Waveform Inversion Using Normalized Wavefield Analysis

To obtain the numerical solution for the media impulse response for scalar and elastic wave equations one needs to spatially discretize the constitutive parameters, and apply finite difference, finite element, or integral equation (boundary element) techniques to solve the governing differential equation of the discretized system. Using the finite difference or finite element method on a mass/spring/damper model of the medium under test, the assembled system of equations, including the damping, takes a general form:

$$M\ddot{p}(t)+C\dot{p}(t)+Kp(t)=g\delta(t) \qquad (7)$$

where the field vector p(t) is the discretized wavefield, M is the mass matrix, K is the stiffness matrix, and C is the damping matrix. If there are a total of N unknowns in the discretization, then all M, C, and K matrices are N×N square, the field vector p is N×1, and the load vector g is also N×1 whose entries are all zero except for '1' values at the source locations. Boundary conditions are implicitly included by the known spatial coordinates, and any level of continuity of the derivatives of the boundary using well-known finite element, boundary element, or finite difference methods, depending on the model solution method utilized.

The reduced system of equations may be solved in the time domain, typically by using coupled first-order differential equations on a staggered grid, or in the frequency domain after Fourier transforming Equation (7), FT{p(t)}→p(ω), into $$-\omega^2 Mp(\omega)+i\omega Cp(\omega)+Kp(\omega)=g. \qquad (8)$$

Next, we will show that the normalized wavefield defined by Equation (6) is all that is required for full waveform inversion. In the inversion the objective error functional typically consists of a measure of the error between the measured data and the resulting model fit. In this case, the normalized wavefield can be used to evaluate the error term. For a given model one can generate synthetic data using Equation (8), and then obtain the model normalized wavefield similar to the data normalized wavefield described by Equation (6).

Formally, the synthetic impulse response at the $j^{th}$ receiver due to the $i^{th}$ source may be obtained and designated as $P_{ji}^m(\omega)$, $$P_{ji}^m(\omega) = \begin{bmatrix} p_{11,ji}^m & p_{12,ji}^m & p_{13,ji}^m \\ p_{21,ji}^m & p_{22,ji}^m & p_{23,ji}^m \\ p_{31,ji}^m & p_{32,ji}^m & p_{33,ji}^m \end{bmatrix}(\omega). \qquad (9)$$

where the superscript m indicates model. Accordingly, the model normalized wavefield (or transfer function) is obtained from the numerical solution for the given velocity model $$T_{ji}^m(\omega) = P_{ji}^m(\omega)[P_{1i}^m]^{-1}(\omega) = \begin{bmatrix} t_{11,ji}^m & t_{12,ji}^m & t_{13,ji}^m \\ t_{21,ji}^m & t_{22,ji}^m & t_{23,ji}^m \\ t_{31,ji}^m & t_{32,ji}^m & t_{33,ji}^m \end{bmatrix}(\omega). \qquad (10)$$

The inversion procedure begins with a measure of the error between the normalized wavefield (or transfer function) model $T^m$ and the data $T^d$, with the subscripts to the normalized wavefield dropped $$\phi(m)=\|W_d(T^m-T^d)\|^2. \qquad (11)$$

The misfit error between data and model transfer functions at the reference point is always zero ($t_{lk1i}^m - t_{lk1i}^d = 0$). In setting up the error functional of Equation (11), both real and imaginary parts are separated, so the actual number of data parts used for the inversion is NEQ=2×NFREQ×NT×(NG−1)×9, and the computation is done in real, or extended real arithmetic. The variable NFREQ is the total number of frequencies. The matrix $W_d$ is an NEQ×NEQ weighing matrix that is the inverse of the standard deviation of the normalized data wavefield $T^d$.

For inversion we consider Gauss-Newton method by first expanding the objective functional, Equation (11), into a Taylor series $$\phi(m+\delta m)=\phi(m)+\gamma_m^T \delta m+0.5\delta m^T H_m \delta m+O\{(\delta m)^3\}. \qquad (12)$$

Here, δm is a perturbation to the minimizing model parameter m, $\gamma_m$ is an M×1 column matrix consisting of elements $$\left\{\frac{\partial \phi}{\partial m_p}, p=1\sim M\right\}$$

with M being the total number of parameters to be determined, and is compactly written as $\gamma_m=2J^T W_d^T W_d(T^m-T^d)$, and $H_m$ is an M×M square matrix (a weighted and constrained Hessian) consisting of elements $$\left\{\frac{\partial^2 \phi}{\partial m_q \partial m_p}, p, q=1\sim M\right\}$$

written as $$H_m = 2J^T W_d^T W_d J + O\left(\frac{\partial J}{\partial m}\right).$$

The last term above, $$O\left(\frac{\partial J}{\partial m}\right),$$

is literally interpreted as the change in the partial derivative of data (transfer function in this case) due to a change in the velocity. This term is small if either the residuals are small, or the forward differential equation is quasi linear. Furthermore, it is usually difficult to compute, so is generally dropped. For each frequency and source the sensitivity function (Jacobian) J is a $\{2\times(NG-1)\times9\}\times M$ rectangular matrix: $\{2\times(NG-1)\times9\}$ because real and imaginary parts have been separated for each of 9 tensor elements. For example, for the $i^{th}$ source and a fixed frequency, the entries to the Jacobian corresponding to the $j^{th}$ receiver and the $p^{th}$ parameter may be obtained as $$\begin{pmatrix} J_{p,l,k,(2*j-1),i} \\ J_{p,l,k,(2*j),i} \end{pmatrix} = \begin{pmatrix} \text{real} \\ \text{imaginary} \end{pmatrix} \frac{\partial}{\partial m_p} t^m_{lk\,ji}; l, k = 1, 2, 3, \quad (13)$$

with $$\frac{\partial t^m_{lk\,ji}}{\partial m_q} = \frac{\partial}{\partial m_q} \frac{\bar{t}^m_{lk\,ji}}{|p^m_{1i}|} = \frac{1}{|p^m_{1i}|} \left( \frac{\partial \bar{t}^m_{lk\,ji}}{\partial m_q} - \frac{\bar{t}^m_{lk\,ji}}{|p^m_{1i}|} \frac{\partial |p^m_{1i}|}{\partial m_q} \right) \quad (14)$$

i=1, 2, ..., NS, j=2, 3, ..., NG, q=1, 2, ..., M.

Here, $|p_{1i}^m|$ is the determinant of the tensor impulse response at the reference receiver point and $\{\bar{t}_{lk1i}^m, l, k=1, 2, 3\}$ are the result of multiplication of $p_{ji}^m(\omega)$ and the adjoint of $p_{1i}^m(\omega)$ (see Appendix A). The partial derivatives of the normalized wavefield can be explicitly written as a function of the partial derivatives of the impulse responses (see Appendix B). Partial derivatives of the impulse responses may be obtained using the forward modeling results using equation (8). The full waveform inversion of seismic data based on equations (11) through (14) will not require the knowledge of the actual source waveform, which is an advantageous feature of this method.

The error functional that will be minimized consists of the error term, Equation (12), and a constraint that will have a smoothing effect on the variation of the model in the updating process. Specifically, it may be written as $$\Phi(m+\delta m) = \phi(m+\delta m) + \lambda \|W_m \delta m\|^2 \quad (15)$$

where $\lambda$ is the Lagrange multiplier that controls relative importance of data errors and the behavior of the parameter variation, and $W_m$, which is an M×M controlling matrix. When the $W_m$ matrix is diagonal it has an effect of keeping the parameter from changing from the current one. On the other hand, if the matrix represents a gradient operator its effect is to spatially smooth out the changes. Minimization of the functional of Equation (15) with respect to perturbation in model parameter results in a system of normal equations $$(J^T W_d^T W_d J + \lambda W_m^T W_m) \delta m = -J^T W_d^T W_d (T^m - T^d), \quad (16)$$

from which the model parameter at the (k+1)-th iteration is updated to $m^{k+1} = m^k + \delta m$.

The iteration process stops when the change in the model parameter $\delta m$ is below a preset tolerance, typically given in terms of root mean square (rms).

Construction of the Source Function

Once the inversion is successful, the functional description of the actual source waveform can be established by deconvolution. The deconvolution can be achieved by dividing the data with the impulse response of the synthetic model that has been obtained through the inversion process. From Equation (2), the deconvolution tensor may be estimated to be $$C_{ji}(\omega) = D_{ji}^d(\omega)[P_{ji}^m]^{-1}(\omega) = \begin{bmatrix} c_{1aji} & c_{1bji} & c_{1cji} \\ c_{2aji} & c_{2bji} & c_{2cji} \\ c_{3aji} & c_{3bji} & c_{3cji} \end{bmatrix}(\omega). \quad (17)$$

Notice that the elements of the impulse response of the model $P_{ji}^m(\omega)$ are independent of the source events (a, b, c), but the elements of the deconvolution tensor $C_{ji}(\omega)$ are related to the source events. If the data and the inversion process were exact, the deconvolution function $C_{ji}(\omega)$ is actually the frequency spectrum of the source, and it must therefore be identical for all receiver position. Since neither the data nor the inversion process are exact, the source function may be obtained by taking a statistical mean of the deconvolution function at different receiver positions. For example the first element of the source function in Equation (4) may be estimated using the root mean square approach $$s_{1ai}(\omega) = \sqrt{\frac{1}{NG} \sum_{j=1}^{NG} \{c_{1aji}(\omega)\}^2}. \quad (18)$$

Since the function $C_{ji}(\omega)$ is itself complex, the averaging process must be done in amplitude and phase, or real and imaginary parts, separately. Inverse Fourier transforming, $FT^{-1}\{S_i(\omega)\} \to S_i(t)$, one obtains the effective source function in time:

$$S_i(t) = \{s_{ai}, s_{bi}, s_{ci}\}(t) = \begin{bmatrix} s_{1ai} & s_{1bi} & s_{1ci} \\ s_{2ai} & s_{2bi} & s_{2ci} \\ s_{3ai} & s_{3bi} & s_{3ci} \end{bmatrix}(t). \quad (19)$$

Note that each one of three events (a,b,c), for example $s_{ai}(t) = \{s_{1ai}, s_{2ai}, s_{3ai}\}^T(t)$, will produce a complete description of the effective source at the transmitter location i as a function of time. The function $S_i(t)$ describes the source at the $i^{th}$ transmitter position that would most likely have produced data $D_{ji}^d(t)$, j=1~NG, shown in Equation (1). The reconstructed source function is the effective source at the time of the event, and will also contain the spatial and temporal radiation patterns.

Full Waveform Inversion of 2-D Acoustic Velocity

The inversion method described here has been tested using a simple 2-D acoustic model. Let us consider the impulse response governed by a 2-D acoustic wave equation in the frequency domain $$\nabla^2 p(x, x_s, \omega) + \frac{\omega^2}{v^2(x)} p(x, x_s, \omega) + \delta(x - x_s) = 0, \quad (20)$$

where the impulse response p is the scalar pressure wavefield, v the velocity, and $(x, x_s)$ are the field and source positions in 2-D. The source is an impulse point source expressed as a 2-D spatial delta function $\delta(x - x_s)$ located at $x_s$, and is also a delta function at t=0 in the time-domain formulation. A finite-element modeling (FEM) scheme is used to generate the synthetic impulse response. The model parameter is the acoustic velocity in each of the rectangular elements used for the FEM solution. Following the procedure described in the previous section, the scalar synthetic normalized wavefield is obtained from the numerical solution for the given velocity model $$t_{ji}^m(\omega) = \frac{p_{ji}^m(\omega)}{p_{1i}^m(\omega)}, (j = 1 \sim NG; i = 1 \sim NS), \quad (21)$$

The inversion procedure starts with an objective functional, Equation (15), reduced to handle scalar problem. The number of equations is NEQ=2×NFREQ×NT×(NG−1), with all computations done in real arithmetic. The related sensitivity functions are $$\begin{pmatrix} J_{p,(2*j-1),i} \\ J_{p,(2*j),i} \end{pmatrix} = \begin{pmatrix} \text{real} \\ \text{imaginary} \end{pmatrix} \frac{\partial}{\partial m_p} t_{ji}^m, \text{ with}$$

$$\frac{\partial t_{ji}^m}{\partial m_p} = \frac{\partial}{\partial m_p} \frac{p_{ji}^m}{p_{1i}^m} = \frac{1}{p_{1i}^m}\left(\frac{\partial p_{ji}^m}{\partial m_p} - \frac{p_{ji}^m}{p_{1i}^m}\frac{\partial p_{1i}^m}{\partial m_p}\right);$$

$$i = 1 \sim NS; j = 2 \sim NG; p = 1 \sim M.$$

Figure 1A:
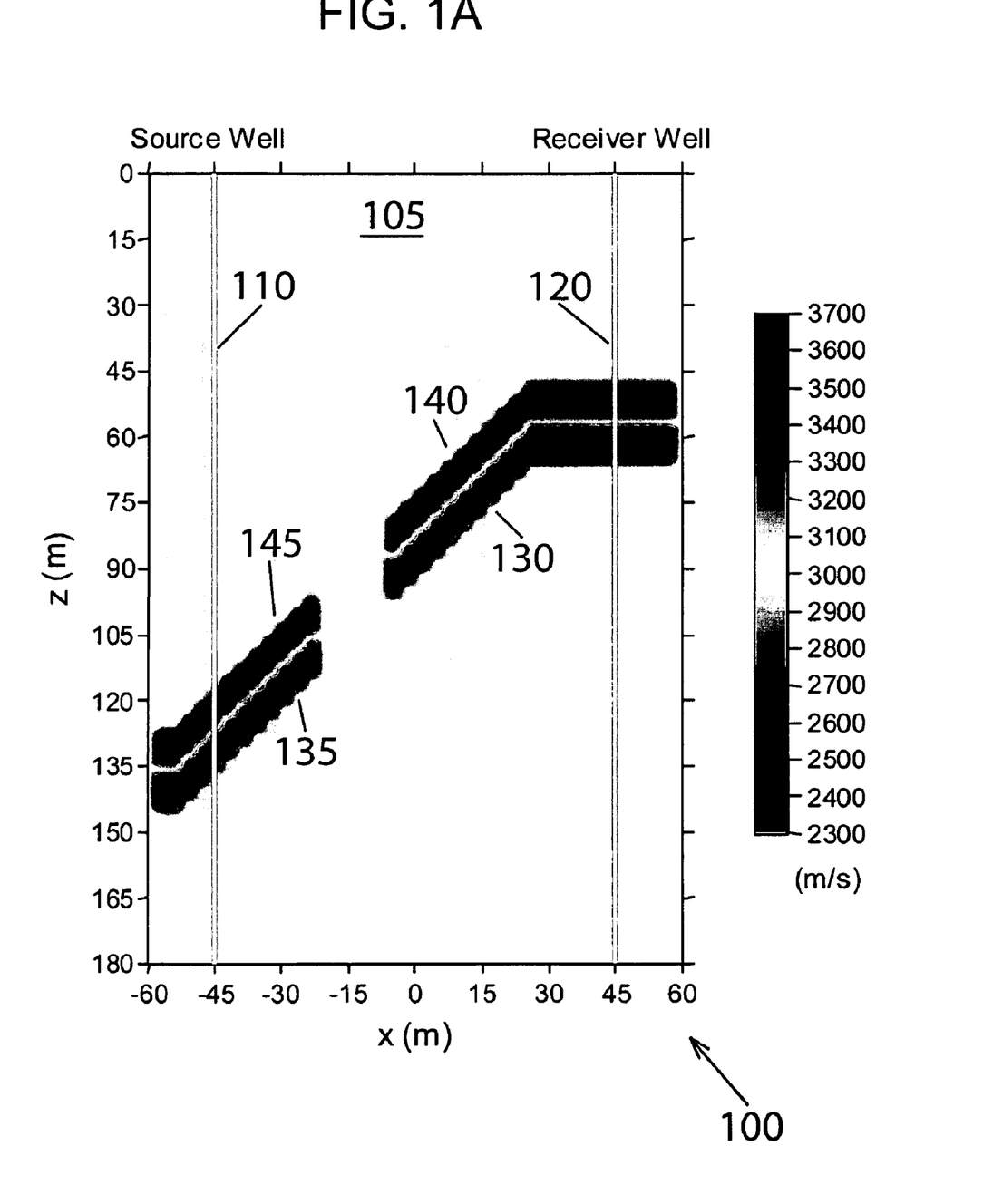
FIG. 1A is a 2-D velocity model using a fault model in a background of 3000 m/s constant velocity

FIGS. 1A shows a model 100 used for the test. The model is a broken dipping fault in a background of material 105 having a 3000 m/s constant velocity. The fault consists of a 6 m thick low velocity (2500 m/s) layer 130 overlain by another 6 m thick high velocity (3500 m/s) layer 140 starting an x position of 30–60 meters, and discontinuously dipping respectively toward the x=−55 meters position with low velocity section 135 and high velocity overlay 145. A cross-hole configuration is used for the exercise, with the borehole at x=−45 m for the transmitter (Tx) borehole 110 and the other at x=45 m for the receiver (Rx) borehole 120. A total of 21 line sources starting at elevation z=0 are used with an equal vertical separation of 9 m, and the same number of receivers and separations for the receivers. Each of the source pressure wavefields computed at 21 receiver positions have been normalized by the first pressure wavefield, resulting in 21 transfer functions. The number of frequencies used is 10; starting from 10 Hz to 100 Hz, linearly separated by 10 Hz. The shortest wavelength in the background is 30 m, so the maximum resolution is expected to be on the order of 7–8 m if we take into account the wavelength as a measure of resolution.

Using the numerical solution of the model as synthetic data, the inversion was initiated with an initial model of 2850 m/s uniform whole space. A grid of uniform cell size, 3 m by 3 m, was used throughout. The inversion domain was 120 m by 180 m, containing a total of 2400 velocity parameters.

The size of the matrix from Equation (15) is relatively modest for the test model, so it was solved by using QR decomposition with successive Householder transformations. The Lagrange multiplier λ is automatically selected in the inversion process. It starts with executing a given number, say nl, of inversions using nl different multipliers that are spaced appropriately. The same Jacobian is used at this step. As a result nl updated parameter sets are produced, followed by nl forward model calculations resulting in nl error terms. Among these, we choose the model and parameter λ giving the lowest error term result.

Figure 1B:
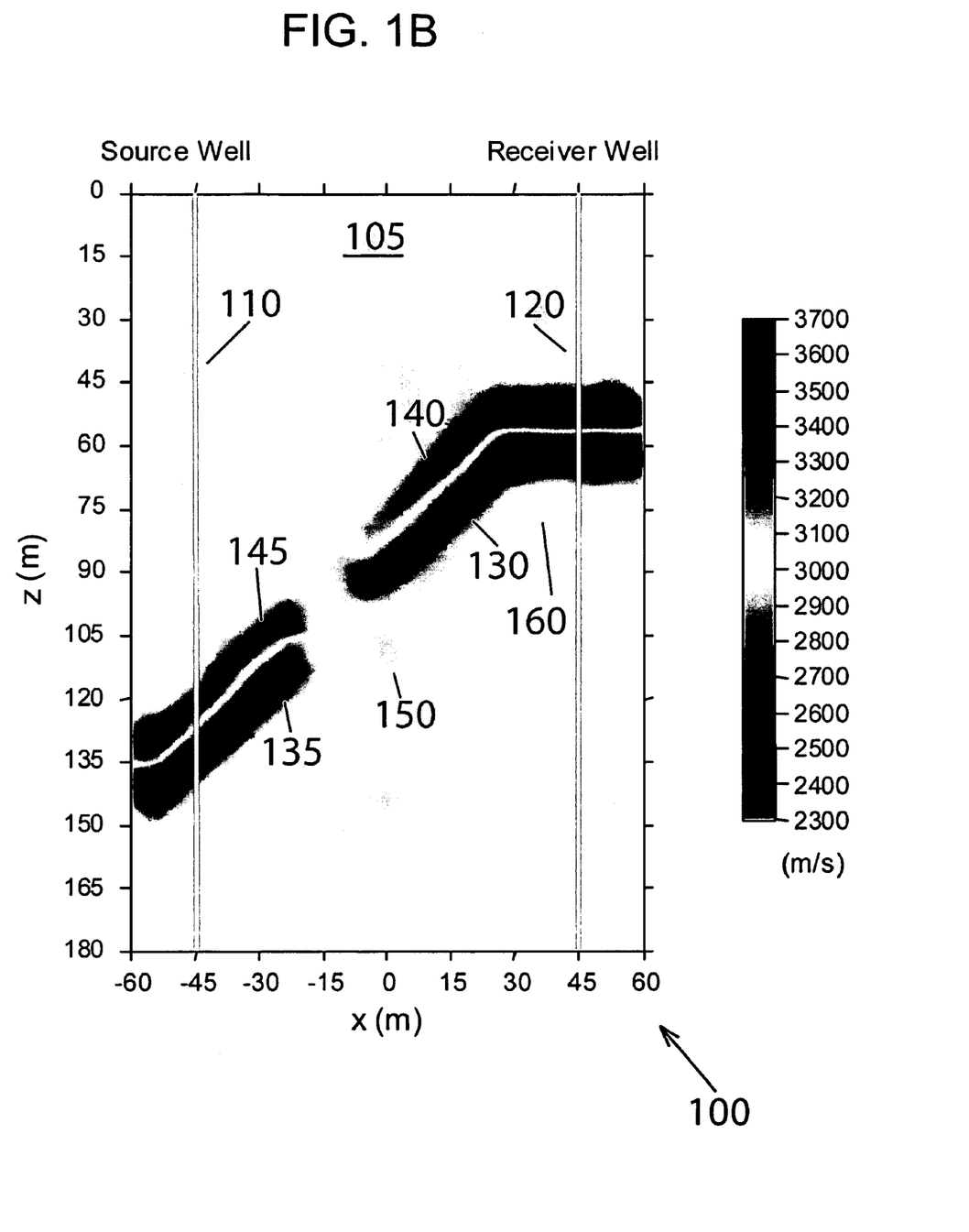
FIG. 1B is the inversion result using impulse response of the model of FIG. 1A.

To demonstrate the validity of the inversion method disclosed here, we first carried out conventional inversion using impulse response, with the result is shown in FIG. 1B, which uses the same numbering scheme of FIG. 1A. Additional features of a slightly slower velocity 150 and a slightly higher velocity 160 are pointed out as artifacts of the limited data set reconstruction. Using standard conventions, we assume that the source waveform is known, so that the data can be reduced to an impulse response, with an inversion carried out by using the impulse response.

It should be pointed out that this numerical simulation has an ideal impulse response, with ideal coupling of the impulse to the medium. This situation is far from common in the field, however, does provide a comparison with the transfer function methods of this invention, which does not depend on source-to-medium coupling.

Figure 1C:
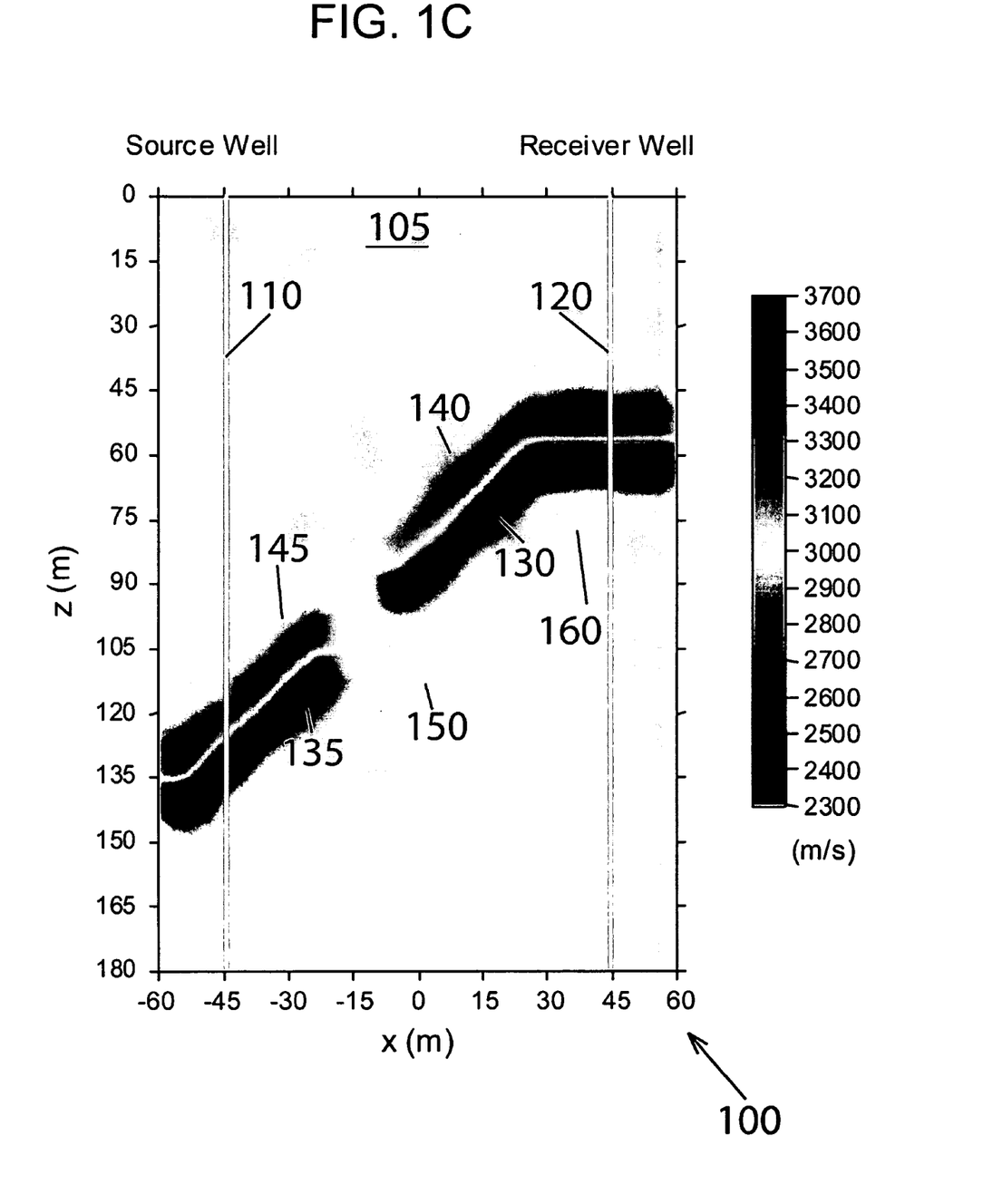
FIG. 1C is the inversion result using normalized wavefield obtained for the model of FIG. 1A.

We additionally obtained the velocity structure by using the transfer function approach, with the result shown in FIG. 1C, which also uses the same numbering scheme of FIG. 1A. Additional features of FIG. 1B showing a slightly slower velocity 150 is no longer readily apparent in the transfer function approach of FIG. 1C. However, the slightly higher velocity 160 of FIG. 1B is still somewhat apparent, but reduced in FIG. 1C. Again, such artifacts are due to the limited data set reconstruction. In this exercise we used nl=3 in each iteration to select parameter update and Lagrange multiplier. After 5 iterations, two of the results appear almost identical. Slight differences may have been due to the fact that the transfer function approach has one less data sample than the impulse response approach because one data sample was used to normalize the others. The behaviors of the rms errors are also similar as discussed below.

Figure 2:
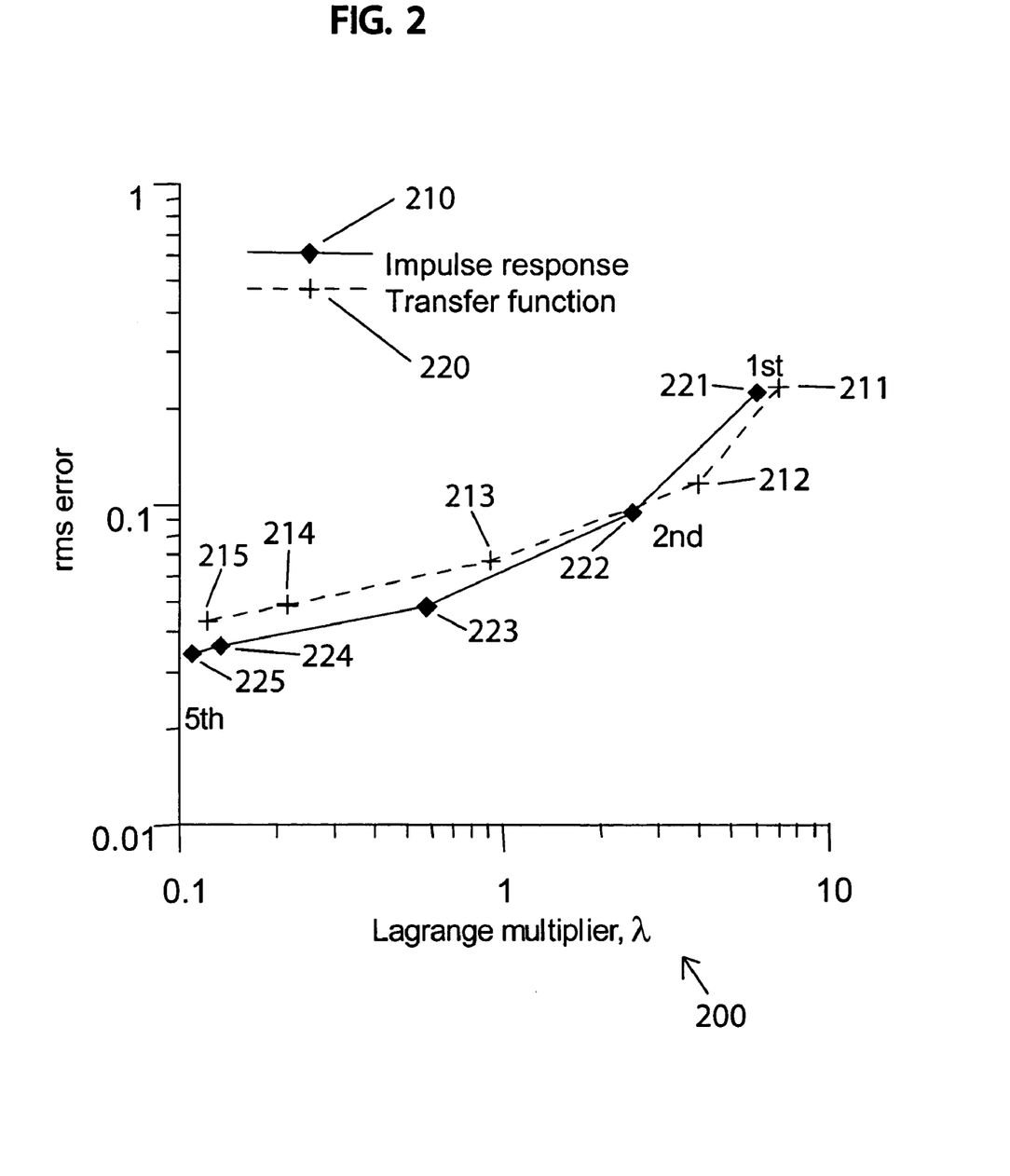
FIG. 2 is a root mean square convergence showing the root mean square (rms) error and the associated Lagrange multipliers as a function of the number of iterations during the full waveform inversion.

FIG. 2 compares in chart 200 the rms errors of both the impulse response 210 to the transfer function method 220. Note that the Lagrange multiplier has also changed as with iteration. Coordinate points 211, 212, 213, 214, and 215 are the first five iterations of the impulse response 210. Similarly, coordinate points 221, 222, 223, 224 and 225 are the first five iterations of the transfer method 220 described herein. It is seen that the transfer method generally yields a better result, and is quite similar in response to the ideal impulse response 210 method. The quality of inversion could be improved by using higher frequency data and by using a higher density deployment of transmitters and receivers, but the method has been successfully demonstrated.

Conclusions

An innovative, rigorous full waveform inversion method has been disclosed, and the validity of the method successfully demonstrated using a simple 2-D synthetic model. An important advantage of the invented method is that full waveform inversion of seismic data may be accomplished without the source information by using the properties of the normalized wavefield describing the system (typically a geological sample) under test. Under the proper combination of sources and receivers, the normalized wavefield is shown to be uniquely determined in terms of the normalized impulse response. The methodology is readily extended to include general 3-D problems. As an important byproduct, it has also been shown that the source function can be reconstructed once the full waveform inversion is completed. The reconstructed source function describes the effective source, not the source system output, at the time of event, including the spatial and temporal radiation patterns.

All publications, patents, and patent applications mentioned in this specification are herein incorporated by reference to the same extent as if each individual publication or patent application were each specifically and individually indicated to be incorporated by reference.

The description given here, and best modes of operation of the invention, are not intended to limit the scope of the invention. Many modifications, alternative constructions, and equivalents may be employed without departing from the scope and spirit of the invention.

Appendix A—The Normalized Wavefield

The relationship between the normalized wavefield and the impulse response is derived. We first rewrite the normalized wavefield defined in equation (6), or equation (10). After dropping the superscript d, the source position index i, and the angular frequency ω, we write $$T_j = P_j[P_1]^{-1} = \begin{bmatrix} t_{11j} & t_{12j} & t_{13j} \\ t_{21j} & t_{22j} & t_{23j} \\ t_{31j} & t_{32j} & t_{33j} \end{bmatrix}, \quad (A\text{-}1)$$

along with the impulse response, equation (5), as $$P_j = \begin{bmatrix} p_{11j} & p_{12j} & p_{13j} \\ p_{21j} & p_{22j} & p_{23j} \\ p_{31j} & p_{32j} & p_{33j} \end{bmatrix}. \quad (A\text{-}2)$$

The matrix operation in equation (A-1) may be expanded to $$T_j = P_j[P_1]^{-1} = \begin{bmatrix} t_{11j} & t_{12j} & t_{13j} \\ t_{21j} & t_{22j} & t_{23j} \\ t_{31j} & t_{32j} & t_{33j} \end{bmatrix} = \begin{bmatrix} p_{11j} & p_{12j} & p_{13j} \\ p_{21j} & p_{22j} & p_{23j} \\ p_{31j} & p_{32j} & p_{33j} \end{bmatrix} \begin{bmatrix} p_{111} & p_{121} & p_{131} \\ p_{211} & p_{221} & p_{231} \\ p_{311} & p_{321} & p_{331} \end{bmatrix}^{-1}$$

$$= \frac{1}{|P_1|}\begin{bmatrix} p_{11j} & p_{12j} & p_{13j} \\ p_{21j} & p_{22j} & p_{23j} \\ p_{31j} & p_{32j} & p_{33j} \end{bmatrix}$$

$$\begin{bmatrix} p_{221}p_{331} - p_{321}p_{231} & p_{321}p_{131} - p_{121}p_{331} & p_{121}p_{231} - p_{221}p_{131} \\ p_{311}p_{231} - p_{211}p_{331} & p_{111}p_{331} - p_{311}p_{131} & p_{211}p_{131} - p_{111}p_{231} \\ p_{211}p_{321} - p_{311}p_{221} & p_{311}p_{121} - p_{111}p_{321} & p_{111}p_{221} - p_{211}p_{121} \end{bmatrix}$$

$$= \frac{1}{|P_1|}\begin{bmatrix} \bar{t}_{11j} & \bar{t}_{12j} & \bar{t}_{13j} \\ \bar{t}_{21j} & \bar{t}_{22j} & \bar{t}_{23j} \\ \bar{t}_{31j} & \bar{t}_{32j} & \bar{t}_{33j} \end{bmatrix}, \quad (A\text{-}3)$$

where the determinant of the reference impulse response is given by $$|P_1|=p_{111}p_{221}p_{331}+p_{121}p_{231}p_{311}+p_{131}p_{321}p_{211}-p_{311}p_{221}p_{131}-p_{321}p_{231}p_{111}-p_{331}p_{121}p_{211}, \quad (A\text{-}4)$$

and elements of the reduced tensor normalized wavefield are $$\bar{t}_{11j}=p_{11j}(p_{221}p_{331}-p_{321}p_{231})+p_{12j}(p_{311}p_{231}-p_{211}p_{331})+p_{13j}(p_{211}p_{321}-p_{311}p_{221})$$

$$\bar{t}_{12j}=p_{11j}(p_{321}p_{131}-p_{121}p_{331})+p_{12j}(p_{111}p_{231}-p_{311}p_{131})+p_{13j}(p_{311}p_{121}-p_{111}p_{321})$$

$$\bar{t}_{13j}=p_{11j}(p_{121}p_{231}-p_{221}p_{131})+p_{12j}(p_{211}p_{131}-p_{111}p_{231})+p_{13j}(p_{111}p_{221}-p_{211}p_{121})$$

$$\bar{t}_{21j}=p_{21j}(p_{221}p_{331}-p_{321}p_{231})+p_{22j}(p_{311}p_{231}-p_{211}p_{331})+p_{23j}(p_{211}p_{321}-p_{311}p_{221})$$

$$\bar{t}_{22j}=p_{21j}(p_{321}p_{131}-p_{121}p_{331})+p_{22j}(p_{111}p_{331}-p_{311}p_{131})+p_{23j}(p_{311}p_{121}-p_{111}p_{321}).$$

$$\bar{t}_{23j}=p_{21j}(p_{121}p_{231}-p_{221}p_{131})+p_{22j}(p_{211}p_{131}-p_{111}p_{231})+p_{23j}(p_{111}p_{221}-p_{211}p_{121})$$

$$\bar{t}_{31j}=p_{31j}(p_{221}p_{331}-p_{321}p_{231})+p_{32j}(p_{311}p_{231}-p_{211}p_{331})+p_{33j}(p_{211}p_{321}-p_{311}p_{221})$$

$$\bar{t}_{32j}=p_{31j}(p_{321}p_{131}-p_{121}p_{331})+p_{32j}(p_{111}p_{331}-p_{311}p_{131})+p_{33j}(p_{311}p_{121}-p_{111}p_{321})$$

$$\bar{t}_{33j}=p_{31j}(p_{121}p_{231}-p_{221}p_{131})+p_{32j}(p_{211}p_{131}-p_{111}p_{231})+p_{33j}(p_{111}p_{221}-p_{211}p_{121}) \quad (A\text{-}5)$$

Appendix B—The Partial Derivatives of the Normalized Wavefield

In Appendix A, each element of the normalized wavefield was shown to be a rational function of combination of elementary impulse responses. Let us rewrite equation (14) for the partial derivatives of the elementary normalized wavefield with respect to the $q^{th}$ parameter $m_q$. After dropping the superscript m and the source position index i, we get $$\frac{\partial t_{lkj}}{\partial m_q} = \frac{\partial}{\partial m_q}\frac{\bar{t}_{lkj}}{|p_1|} = \frac{1}{|p_1|}\left(\frac{\partial \bar{t}_{lkj}}{\partial m_q} - \frac{\bar{t}_{lkj}}{|p_1|}\frac{\partial |p_1|}{\partial m_q}\right), \quad (B\text{-}1)$$

where the determinant is given by equation (A-4). To illustrate the process of obtaining partial derivatives of normalized wavefields, we will choose an element, say $\bar{t}_{31j}$, which is given in equation (A-5). Partial derivatives of $|P_1|$ and $\bar{t}_{31j}$ with respect to the parameter $m_q$ are:

$$\frac{\partial |p_1|}{\partial m_q} = \frac{\partial p_{111}}{\partial m_q} p_{221} p_{331} + p_{111} \frac{\partial p_{221}}{\partial m_q} p_{331} + p_{111} p_{221} \frac{\partial p_{331}}{\partial m_q} + \qquad (B\text{-}2)$$
$$\frac{\partial p_{121}}{\partial m_q} p_{231} p_{311} + p_{121} \frac{\partial p_{231}}{\partial m_q} p_{311} + p_{121} p_{231} \frac{\partial p_{311}}{\partial m_q} +$$
$$\frac{\partial p_{131}}{\partial m_q} p_{321} p_{211} + p_{131} \frac{\partial p_{321}}{\partial m_q} p_{211} + p_{131} p_{321} \frac{\partial p_{211}}{\partial m_q} -$$
$$\frac{\partial p_{311}}{\partial m_q} p_{221} p_{131} - p_{311} \frac{\partial p_{221}}{\partial m_q} p_{131} - p_{311} p_{221} \frac{\partial p_{131}}{\partial m_q} -$$
$$\frac{\partial p_{321}}{\partial m_q} p_{231} p_{111} - p_{321} \frac{\partial p_{231}}{\partial m_q} p_{111} - p_{321} p_{231} \frac{\partial p_{111}}{\partial m_q} -$$
$$\frac{\partial p_{331}}{\partial m_q} p_{121} p_{211} - p_{331} \frac{\partial p_{121}}{\partial m_q} p_{211} - p_{331} p_{121} \frac{\partial p_{211}}{\partial m_q}$$

and $$\frac{\partial \bar{t}_{31j}}{\partial m_q} = \frac{\partial p_{31j}}{\partial m_q}(p_{221}p_{331} - p_{321}p_{231}) + \qquad (B\text{-}3)$$
$$p_{31j}\left(\frac{\partial p_{221}}{\partial m_q}p_{331} + p_{221}\frac{\partial p_{331}}{\partial m_q} - \frac{\partial p_{321}}{\partial m_q}p_{231} - p_{321}\frac{\partial p_{231}}{\partial m_q}\right) +$$
$$\frac{\partial p_{32j}}{\partial m_q}(p_{311}p_{231} - p_{211}p_{331}) +$$
$$p_{32j}\left(\frac{\partial p_{311}}{\partial m_q}p_{231} + p_{311}\frac{\partial p_{231}}{\partial m_q} - \frac{\partial p_{211}}{\partial m_q}p_{331} - p_{211}\frac{\partial p_{331}}{\partial m_q}\right) +$$
$$\frac{\partial p_{33j}}{\partial m_q}(p_{211}p_{321} - p_{311}p_{221}) +$$
$$p_{33j}\left(\frac{\partial p_{211}}{\partial m_q}p_{321} + p_{211}\frac{\partial p_{321}}{\partial m_q} - \frac{\partial p_{311}}{\partial m_q}p_{221} - p_{311}\frac{\partial p_{221}}{\partial m_q}\right).$$

Substituting (B-2) and (B-3) into (B-1), we get the partial derivative of $t_{31j}$ with respect to the parameter $m_q$. So, partial derivatives of the normalized wavefield may be evaluated in terms of a combination of partial derivatives of the impulse responses:

$$\frac{\partial t_{lkj}}{\partial m_q} = f\left(\frac{\partial p_{lkj}}{\partial m_q}\right); \; l, k = 1, 2, 3; \; j = 1, 2, 3, \ldots, NG, \qquad (B\text{-}4)$$

where NG is the number of receiver measurement positions.

I claim:

1. An iterative method of normalized waveform invasion to obtain a model parameter describing one or more physical properties of a medium, the method comprising the steps of:
   a) inputting a time domain measurement data set $D_{ji}^d(t)$, (j=1~NG; i=1~NS),
   where d denotes a data tensor, NG is the number of receivers and NS is the number of sources;
   b) means for minimizing a model parameter m below an error bound in the process of creating a normalized waveform inversion, wherein said minimizing step further comprises:
      i) Fourier transforming the time domain measurement data set $D_{ji}^d(t)$ to create a measurement spectral data set $D_{ji}^d(\omega)$;
      ii) normalizing the measurement spectral data set $D_{ji}^d(\omega)$ to create a normalized data wavefield $T_{ji}^d(\omega)$;
      iii) modeling a medium by iterating the model parameter m describing one or more physical properties of the medium; by
         (1) minimizing a weighted error, between the normalized data wavefield $T_{ji}^d(\omega)$ and the normalized modeled wavefield $T_{ji}^m(\omega)$ of the response of the medium, to a level below the error bound;
         (2) outputting the iterated model parameter m corresponding to the weighted error below the error bound, as a minimized model parameter.

2. The method of claim 1, wherein within the modeling step the physical property is selected from the group comprising: a velocity of sound propagation, density, permeability, porosity, resistivity, permittivity, Young's modulus, a component of the tensorial stress-strain properties, shear modulus, amount of water present, and amount of oil present.

3. The method of claim 1, wherein within the modeling step the error bound divided by an initial error $E_0$ is selected from the group consisting of: below $10^{-5}$, below $10^6$, below $10^{-7}$, and below $10^{-8}$.

4. An iterative method of using normalized waveform inversion to obtain a model parameter describing one or more physical properties of a medium, the method comprising the steps of:
   a) inputting one or more each of NS source and NG measurement spatial locations;
   b) measuring time domain data at each of the NG measurement locations resulting from an input waveform at one of the NS source locations propagating through a medium,
      i) for each of the NS source locations,
      ii) thereby forming a time domain measurement data set $D_{ji}^d(t)$, (j=1~NG; i=1~NS), where d denotes a data tensor;
   c) Fourier transforming the time domain measurement data set $D_{ji}^d(t)$ to create a measurement spectral data set $D_{ji}^d(\omega)$ having frequency and amplitude information for each of the NG measurement locations;
   d) normalizing the measurement spectral data set $D_{ji}^d(\omega)$ to create a normalized data wavefield $T_{ji}^d(\omega)$;
   e) modeling the medium using an iterated model parameter m describing one or more physical properties of the medium,
      (1) the NS source and the NG measurement spatial locations used as respective model input and model response spatial locations contained within the model of the medium,
      (2) and initializing the iterated model parameter in with corresponding one or more known bulk properties or the medium being modeled,
      ii) said modeling step comprising:
      iii) creating a measurement model by:
         (1) applying a delta function source collocated with the $i^{th}$ NS source,
         (2) modeling the response at the NG measurement locations, using a time domain modeling method, to create a synthetic medium response at the $j^{th}$ receiver due to the $i^{th}$ source, $P_{ji}^m(t)$, m denoting the model response,
         (3) repeating the applying and modeling steps at each of the NS source locations and NG measurement locations until the measurement model is full, and
      iv) Fourier transforming the model response $P_{ji}^m(t)$, to obtain a frequency domain synthetic response $P_{ji}^m(\omega)$;

v) forming a normalized modeled wavefield using the frequency domain synthetic response $T_{ji}^m(\omega)=P_{ji}^m(\omega)[P_{1i}^m(\omega)]^{-1}$; and f) minimizing a weighted error, between the normalized data wavefield $T_{ji}^d(\omega)$ and the normalized modeled wavefield $T_{ji}^m(\omega)$ of the response of the medium, to a level below an error bound, i) said weighted error met by using the iterated model parameter m, known as the a minimized model parameter m.

5. The method of claim 1 wherein the modeled normalized wavefield $T_{ji}^m(\omega)$ is independent of the input waveform applied to any of the NS source locations.

6. The method of claim 1 further comprising the step of:
a) storing the minimized model parameter m in a computer-readable medium.

7. The method of claim 1 further comprising the steps of:
a) displaying the minimized model parameter m as a graphical representation of one or more of the physical properties of the medium measured,
b) storing an output image represented by the minimized model parameter m in a computer-readable medium.

8. The method of claim 1 further comprising the step of;
a) storing as a computer program in at least one computer-readable medium,
b) said steps of claim 1.

9. The method of claim 1 wherein said weighted error results from a weighing matrix $W_d$ that is an inverse of the standard deviation of the normalized data wavefield $T_{ji}^d(\omega)$.

10. The method of normalized waveform inversion of claim 1 wherein said minimizing step weighted error $\phi(m)$ is calculated by a root mean square of the weighing matrix $W_6$ multiplied by the difference between the normalized data wavefield $T_{ji}^d(\omega)$ and the normalized modeled wavefield $T_{ji}^m(\omega)$, or $\phi(m)=\|W_d(T_{ji}^d(\omega)-T_{ji}^m(\omega)\|^2$ summed over all frequencies, i sources, and j receivers.

11. The method of claim 1 wherein said normalization step is further comprised of the steps of:
a) choosing one of the measurement spectral data set $D_{ji}^d(\omega)$ at one of the measurement locations, such as $D_{1i}^d(\omega)$,
  (1) said chosen measurement spectral data set $D_{1i}^d(\omega)$ known as a reference measurement;
  ii) dividing the measurement spectral data set $D_{1i}^d(\omega)$ amplitude at a particular frequency in the measurement spectral data set $D_{ji}^d(\omega)$,
  iii) by the amplitude of the reference measurement $D_{1i}^d(\omega)$ at the same frequency,
b) to create a normalized data wavefield $T_{ji}^d(\omega)$.

12. The method of claim 1 wherein the error bound of the minimizing step is calculated by first assigning an initial error $E_0$, then dividing each subsequent iterated error bound by the initial error $E_0$.

13. An iterative method of using normalized waveform inversion to obtain a model parameter describing one or more physical properties of a medium, the method comprising the steps of:
a) inputting one or more each of NS source and NG measurement spatial locations;
b) measuring time domain data at each of the NG measurement locations resulting from an input waveform at one of the NS source locations propagating through a medium,
  i) for each of the 195 source locations,
  ii) thereby forming a time domain measurement data set $D_{ji}^d(t)$, (j=1~NG; i=1~NT), where d denotes a data tensor;
c) Fourier transforming the time domain measurement data set $D_{ji}^d(t)$ to create a measurement spectral data set $D_{ji}^d(\omega)$ having frequency and amplitude information for each of the NG measurement locations;
d) normalizing the measurement spectral data set $D_{ji}^d(\omega)$ to create a normalized data wavefield $T_{ji}^d(\omega)$;
e) modeling the medium using an iterated model parameter m describing one or more physical properties of the medium,
  the NS source and the NG measurement spatial locations used as respective model input and model response spatial locations contained within the model of the medium,
  and initializing the iterated model parameter m with corresponding one or more known bulk properties of the medium being modeled,
  said modeling step comprising:
  i) creating a measurement model by:
    (1) applying a delta function source collocated with the $i^{th}$ NS source,
    (2) modeling the response at the NG measurement locations, using a time domain modeling method, to create a synthetic medium response at the $j^{th}$ receiver due to the $i^{th}$ source, $P_{ji}^m(t)$, m denoting the model response,
    (3) repeating the applying and modeling steps at each of the NS source locations and NG measurement locations until the measurement model is full, and
  ii) Fourier transforming the model response $P_{ji}^m(t)$, to obtain a frequency domain synthetic response $P_{ji}^m(t)$;
  iii) forming a normalized modeled wavefield using the frequency domain synthetic response $T_{ji}^m(\omega)=P_{ji}^m(\omega)[P_{1i}^m(\omega)]^{-1}$; and
f) minimizing a weighted error, between the normalized data wavefield $T_{ji}^d(\omega)$ and the normalized modeled wavefield $T_{ji}^m(\omega)$ of the response of the medium, to a level below an error bound,
g) said weighted error met by using the iterated model parameter m, known as the a minimized model parameter m.

14. The method of claim 1 further comprising the step of;
a) storing as a computer program in at least one computer-readable medium,
  i) said steps of claim 1.

15. An article of manufacture for normalized waveform inversion using a computer, said article comprising:
a computer readable medium comprising instructions for a computer to execute, said execution comprising the steps of:
a) inputting one or more each of NS source and NG measurement spatial locations;
b) measuring time domain data at each of the NG measurement locations resulting from an input waveform at one of the NS source locations propagating through a medium,
  i) for each of the NS source locations,
  ii) thereby forming a time domain measurement data set $D_{ji}^d(t)$, (j=1~NG; i=1~NS), where d denotes a data tensor;
c) Fourier transforming the time domain measurement data set $D_{ji}^d(t)$ to create a measurement spectral data set $D_{ji}^d(\omega)$ having frequency and amplitude information for each of the NG measurement locations;
d) normalizing the measurement spectral data set $D_{ji}^d(\omega)$ to create a normalized data wavefield $T_{ji}^d(\omega)$;

e) modeling the medium using an iterated model parameter m describing one or more physical properties of the medium,
the ATS source and the NG measurement spatial locations used as respective model input and model response spatial locations contained within the model of the medium.
and initializing the iterated model parameter m with corresponding one or more known bulk properties of the medium being modeled,
said modeling step comprising;
i) creating a measurement model by:
(1) applying a delta function source collocated with the $i^{th}$ NS source,
(2) modeling the response at the NG measurement locations, using a time domain modeling method, to create a synthetic medium response at the $j^{th}$ receiver due to the $i^{th}$ source, $P_{ji}^m(\omega)$, m denoting the model response,
(3) repeating the applying and modeling steps at each of the NS source locations and NG measurement locations until the measurement model is full, and
ii) Fourier transforming the model response $P_{ji}^m(\omega)$, to obtain a frequency domain synthetic response $P_{ji}^m(\omega)$;
iii) forming a normalized modeled wavefield using the frequency domain synthetic response $T_{ji}^m(\omega) = P_{ji}^m(\omega)[P_{1i}^m(\omega)]^{-1}$; and
f) minimizing a weighted error, between the normalized data wavefield $T_{ji}^d(\omega)$ and the normalized modeled wavefield $T_{ji}^m(\omega)$ of the response of the medium, to a level below an error bound,
i) said weighted error met by using the iterated model parameter m, known as the a minimized model parameter m.

16. An iterative method of using normalized waveform inversion to obtain a model parameter describing one or more physical properties of a medium, the method comprising the steps of:
a) inputting one or more each of NS source and NG measurement spatial locations;
b) measuring time domain data at each of the NG measurement locations resulting from an input waveform at one of the NS source locations propagating through a medium,
i) for each of the NS source locations,
ii) thereby forming a time domain measurement data set $D_{ji}^d(\omega)$, (j=1~NG; i=1~NS) where d denotes a data tensor;
c) Fourier transforming the time domain measurement data set $D_{ji}^d(t)$ to create a measurement spectral data set $D_{ji}^d(\omega)$ having frequency and amplitude information for each of the NG measurement locations;
d) normalizing the measurement spectral data set $D_{ji}^d(\omega)$ to create a normalized data wavefield $T_{ji}^d(\omega)$;
e) modeling the medium using an iterated model parameter m describing one or more physical properties of the medium.
the NS source and the NG measurement spatial locations used as respective model input and model response spatial locations contained within the model of the medium,
and initializing the iterated model parameter m in with corresponding one or more known bulk properties of the medium being modeled,
said modeling step comprising:
i) creating a measurement model by:
(1) applying a delta function source collocated with the $i^{th}$ source,
(2) modeling the response at the NG measurement locations, using a frequency domain modeling method, to create a frequency domain synthetic response at the $j^{th}$ receiver due to the $i^{th}$ source, $P_{ji}^m(\omega)$, m denoting the model response,
(3) repeating the applying and modeling steps at each of the NS source locations and NG measurement locations until the frequency domain synthetic response is full, and
ii) forming a normalized modeled wavefield using the frequency domain synthetic response $T_{ji}^m(\omega) = P_{ji}^m(\omega)[P_{1i}^m(\omega)]^{-1}$; and
f) minimizing a weighted error, between the normalized data wavefield $T_{ji}^d(\omega)$ and the normalized modeled wavefield $T_{ji}^m(\omega)$ of the response of the medium, to a level below an error bound,
i) said weighted error met by using the iterated model parameter m, known as the a minimized model parameter m.

17. The method of claim 1 further comprising the step of;
a) storing as a computer program in at least one computer-readable medium, said steps of claim 1.

18. An article of manufacture for normalized waveform inversion using a computer, said article comprising: a computer readable medium comprising instructions for a computer to execute, said execution comprising the steps of claim 1.

* * * * *